July 15, 1924.　　　　　　　　　　　　　　1,501,866
E. C. ROWE ET AL
WEIGHING SCALE
Original Filed Sept. 29, 1921
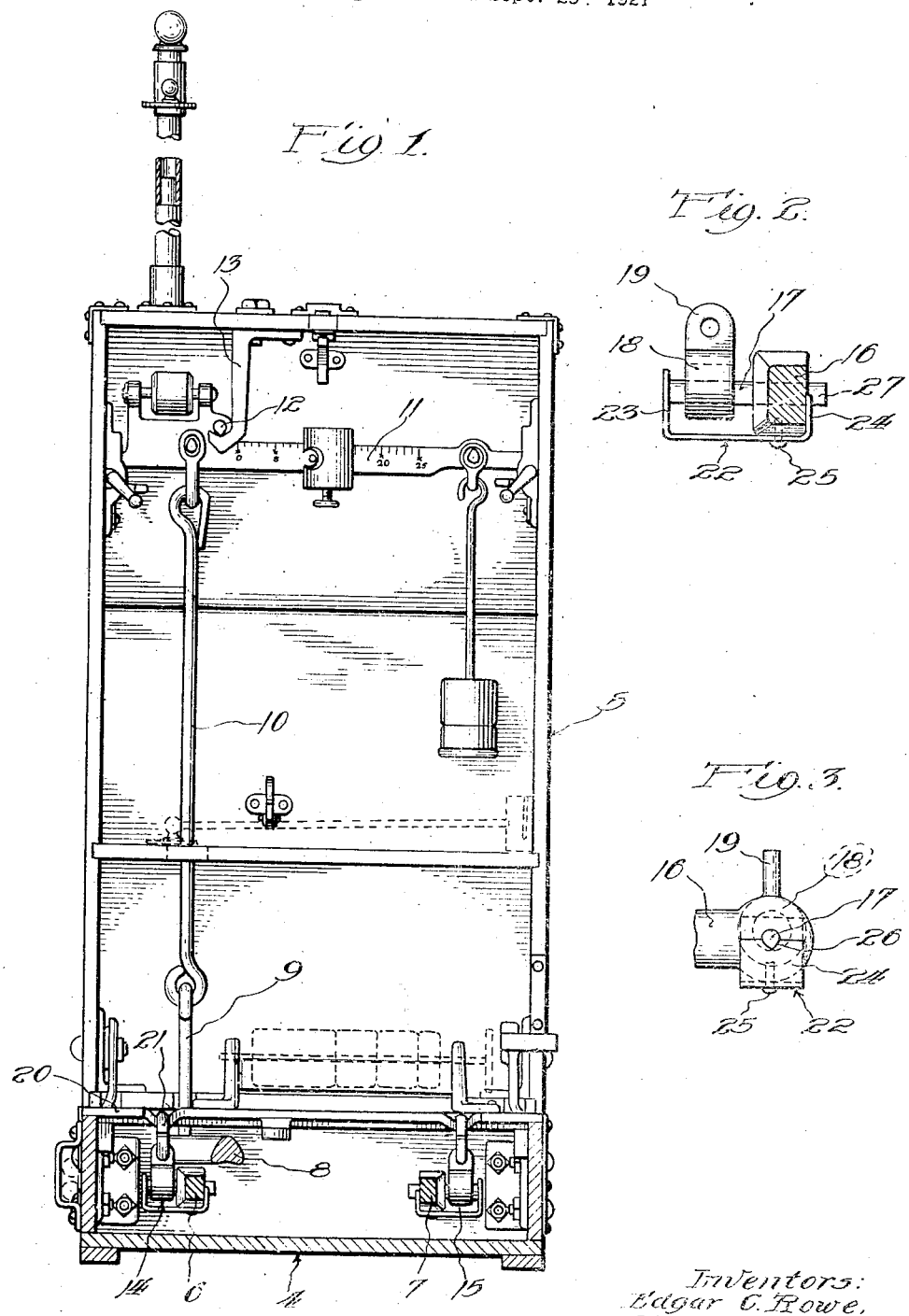
Inventors:
Edgar C. Rowe,
Adolph Mohr

Patented July 15, 1924.

1,501,866

UNITED STATES PATENT OFFICE.

EDGAR C. ROWE AND ADOLPH MOHR, OF CHICAGO, ILLINOIS, ASSIGNORS TO MASON, DAVIS & COMPANY, OF CHICAGO, ILLINOIS, A CORPORATION OF MAINE.

WEIGHING SCALE.

Original application filed September 29, 1921, Serial No. 504,146. Divided and this application filed March 18, 1922. Serial No. 544,757.

*To all whom it may concern:*

Be it known that we, EDGAR C. ROWE and ADOLPH MOHR, both citizens of the United States, and both residing at Chicago, Cook County, Illinois, have invented certain new and useful Improvements in Weighing Scales, of which the following is a specification.

This invention has to do with certain improvements in the construction of weighing scales and the like. The invention has reference particularly to the arrangement of the knife edge supports for certain of the weighing beams and similar parts through which the weighing forces must be transmitted with accuracy and as little friction as possible.

One of the objects of the invention is to provide a knife edge support of such arrangement that the knife edge and the surface against which it bears will be at all times held in proper co-operative registry. In this connection, another object is to provide an arrangement such that in those cases in which the co-operative engagement is between a knife edge and an eye or eyelet, the parts will be retained against endwise displacement from each other.

In connection with the foregoing, a further object of the invention is to provide in devices of this kind a guard which may be readily attached to one of the beams or elements, and which when in place will co-operate therewith and with the knife edge itself in such a manner as to prevent the aforesaid displacement from taking place. In connection with the foregoing, a further object is to provide a construction such that the aforesaid guard, when used, may be readily adjusted to the beam by the use of a single screw or pin, but which guard when so attached will be securely held and will be retained against twisting or similar angular displacement.

A further object of the invention is to provide a construction which shall be very simple in form and very inexpensive to manufacture and assemble.

Other objects and uses of the invention will appear from a detailed description of the same, which consists in the features of construction and combinations of parts hereinafter described and claimed.

In the drawing:

Figure 1 shows a vertical section through a weighing scale which is provided with knife edges and guards of the general form to which this invention relates;

Fig. 2 shows a detailed side view of the knife edge and guard on enlarged scale as compared to Fig. 1; and Fig. 3 shows an end view corresponding to Fig. 2.

We will first state that this application is a division of our co-pending application for Letters Patent of the United States on improvements in weighing scales, Serial No. 504,146, which was filed September 29, 1921. In that application there is disclosed a construction of weighing scale including a box like structure having the base section 4 and the upright back section 5. The base section carries a weighing pan which is supported on levers including the levers 6 and 7 from which the weighing forces are ultimately transmitted to a lever 8 whose rear end connects by suitable links 9 and 10 with a weighing beam 11. Said weighing beam is in turn supported by knife edges 12 from a bracket 13 in the upper portion of the upright section 5 of the box like structure. For the purposes of the present invention, we do not consider it necessary to describe the construction in detail beyond pointing out that they include knife edges such as are typically shown at 14 and 15 in Fig. 1.

Considering Figs. 2 and 3, we have therein designated one of the beams by the numeral 16. It is provided with a transversely extending knife edge 17 which projects to one side of the beam 16 a sufficient distance to receive a co-operating surface bearing member. It also preferably projects to the other side of the beam 16 a slight distance, as shown in Fig. 2, in order to establish a lug with which the guard, presently to be described, may operate, although such projection is not necessary in many instances.

The knife edge 17 may be secured to or within the beam 16 in any convenient manner, but in many cases it will be found satisfactory to cast the knife edge into the material of the beam itself at the time the beam is molded.

In the construction illustrated, the knife edge faces downwardly. In this construction also the supporting portion of the knife edge operates with an eyelet 18 through which the knife edge extends, which eyelet is provided with a perforated lug 19 by means of which it may be supported, as from a bracket 20 by means of a ring 21, as shown in Fig. 1. The eyelet 18 is of sufficient size to allow the knife edge to move about freely and in such a manner that the knife edge makes contact only on a line of contact.

In order to retain the knife edge in proper engagement with the part with which it is intended to co-operate, in the form shown in the drawing, the eyelet, we have provided a guard 22. This guard comprises a U-shaped strip of metal having the upturned arms 23 and 24. The guard is held in position with respect to the beam 16 in any suitable manner as by means of a pin or screw 25. The arm 23 overlies the end of the knife edge 17 and closely engages the same so that the eyelet 18 is prevented from becoming disengaged from the knife edge. In fact, it is preferred that the arm 23 come into direct contact with the knife edge as shown in Fig. 2.

The arm 24 is intended to lie snugly against the side surface of the beam 16, as shown in Fig. 2, and thus assist in preventing the guard 22 from turning on the pin 25 as a pivot. In this way, the arm 23 is maintained in proper registry with the end of the knife edge. The guard might also be clearly retained against pivoting on the pin 25 by tightening up said pin to a sufficient degree. The presence of the arm 24 will then prevent such pivoting movement even in case the pin should become loosened up.

The upper portion of the arm 24 is notched as shown in Fig. 3 at the point 26, said notch engaging the projecting portion 27 of the knife edge. When such a construction as the foregoing is used, the bracket 22 is further retained against swiveling on the pin 25 even without the necessity of the arm 24 maintaining close and snug contact with the side face of the beam 16.

It will be understood that in the drawing of the present case we have illustrated the guard construction as being incorporated within an arrangement in which the knife edge co-operates with an eyelet, but manifestly any other suitable form of co-operative element might be used in place of the eyelet, the guard in such case also preventing the element from disengaging from the knife edge in an endwise direction. Nevertheless, we wish to call attention to the fact that the features of the present invention are herein illustrated as being used within a construction of scales which is intended to be folded up and is of such form and size that it can be conveniently carried from place to place. In a scale of this type, there is added tendency for the parts to become disengaged from each other and therefore there is a special benefit to be had in the use of the guard of the present invention for keeping the parts together in this type of scale construction.

We claim:

1. In a weighing scale the combination of a beam, an inverted knife edge extending through said beam and projecting therefrom at both sides, a loop member through which said knife edge extends, and a U-shaped clip passing beneath and secured to the beam at a point beneath the knife edge, one end of said clip overlying the end of the knife edge immediately beyond the position of the loop member to retain the loop member in position on the knife edge and the other end of said clip being in engagement with the knife edge adjacent to the opposite face of the beam, substantially as described.

2. In a weighing scale the combination of a beam, a knife edge extending through said beam and projecting beyond the beam, a loop member through which said knife edge projects, and a U-shaped clip secured to the beam opposite to the knife edge, one end of said clip being in engagement with the end of the knife edge immediately beyond the position of the loop member and the other end of the clip being in engagement with the opposite face of the beam, substantially as described.

EDGAR C. ROWE.
ADOLPH MOHR.